United States Patent
Amos et al.

(10) Patent No.: US 9,634,756 B2
(45) Date of Patent: Apr. 25, 2017

(54) FLEXIBLE PAYLOAD AND METHOD OF RECONFIGURING FLEXIBLE PAYLOAD IN CASE OF INTERFERENCE

(71) Applicant: EUTELSAT S A, Paris (FR)

(72) Inventors: Sonya Amos, Paris (FR); Hector Fenech, Issy-les-Moulineaux (FR)

(73) Assignee: EUTELSAT S A, Paris (FR)

( * ) Notice: Subject to any disclaimer, the term of this patent is extended or adjusted under 35 U.S.C. 154(b) by 56 days.

(21) Appl. No.: 14/656,843

(22) Filed: Mar. 13, 2015

(65) Prior Publication Data
US 2015/0263803 A1 Sep. 17, 2015

(30) Foreign Application Priority Data

Mar. 14, 2014 (EP) .................... 14305369

(51) Int. Cl.
| | | |
|---|---|---|
| *H04B 7/185* | (2006.01) | |
| *H04L 5/00* | (2006.01) | |
| *H04W 16/26* | (2009.01) | |
| *H04W 72/04* | (2009.01) | |
| *H04W 72/08* | (2009.01) | |

(52) U.S. Cl.
CPC ..... *H04B 7/18582* (2013.01); *H04B 7/18519* (2013.01); *H04L 5/0044* (2013.01); *H04W 16/26* (2013.01); *H04W 72/0473* (2013.01); *H04W 72/082* (2013.01)

(58) Field of Classification Search
CPC H04B 7/18582; H04B 7/18519; H04B 7/185; H04W 72/0473; H04W 72/082; H04W 16/26; H04W 72/08; H04W 84/06; H04L 5/0044
See application file for complete search history.

(56) References Cited

U.S. PATENT DOCUMENTS

| | | | | |
|---|---|---|---|---|
| 4,163,942 A | | 8/1979 | Acampora et al. | |
| 6,275,188 B1 | | 8/2001 | Chen | |
| 7,068,975 B2 | * | 6/2006 | Loner ............... | H04B 7/18517 455/101 |
| 7,831,202 B2 | * | 11/2010 | Karabinis .......... | H04B 7/18521 343/705 |
| 8,948,080 B2 | * | 2/2015 | Wahlberg .......... | H04B 7/18532 370/264 |

(Continued)

FOREIGN PATENT DOCUMENTS

EP  1 030 465 A1  8/2000

OTHER PUBLICATIONS

Extended European Search Report as issued in European Patent Application No. 14305369.2, dated Jul. 8, 2014.

*Primary Examiner* — Mohamed Kamara
(74) *Attorney, Agent, or Firm* — Pillsbury Winthrop Shaw Pittman LLP

(57) ABSTRACT

A flexible payload for a satellite includes a main uplink antenna device configured to receive at least a main uplink signal over a main coverage area; a reconfigurable uplink antenna device configured to receive a complementary uplink signal over a complementary coverage area; a command device configured to define the complementary coverage area of the reconfigurable uplink antenna device, and an agile converting device configured to generate a spectral hole in the bandwidth of the main uplink signal.

9 Claims, 4 Drawing Sheets

(56) References Cited

U.S. PATENT DOCUMENTS

| | | | |
|---|---|---|---|
| 2001/0034206 A1* | 10/2001 | Thompson | H04B 7/2041 455/12.1 |
| 2008/0090516 A1* | 4/2008 | Thomas | H04B 7/2041 455/12.1 |
| 2010/0040178 A1* | 2/2010 | Sutton | H04B 7/0845 375/345 |
| 2011/0075601 A1 | 3/2011 | Zheng | |
| 2013/0182794 A1* | 7/2013 | Ringstrom | H04B 7/0434 375/297 |
| 2014/0226555 A1* | 8/2014 | Bell | H04B 7/18515 370/312 |

* cited by examiner

FLEXIBLE PAYLOAD AND METHOD OF RECONFIGURING FLEXIBLE PAYLOAD IN CASE OF INTERFERENCE

CROSS REFERENCE TO RELATED APPLICATIONS

This application claims the benefit of priority from European Patent Application No. 14305369.2 filed on Mar. 14, 2014, the entire content of which is incorporated herein by reference.

FIELD

The present invention relates to a flexible payload and to a method of reconfiguring a flexible payload in case of interference.

BACKGROUND

It is known that satellites include two subsystems: the platform and the payload. The platform supports the payload. Typically the payload is designed with a specific mission in mind. A communication payload typically includes a number of transponders that receives the uplink signal and transmits the downlink signal. Consequently, the transponder's receive frequency, bandwidth and transmit frequency are all fixed during the satellite design phase, typically several years before entering into service. The payload is then 'frozen' in its design at the contract stage unless a change is particularly foreseen.

During the lifetime of a satellite, however, evolving business and political landscapes, the emergence of new technologies and applications, or even a change of orbital location or owner, can alter the operational requirements on the payload. With the expected lifetime of current commercial satellites exceeding 15 years, the ability to adapt to these changing needs would be highly advantageous. In today's environment, flexibility at the payload level is becoming a more attractive solution. As technology advances, solutions are becoming evident which are more cost effective. This is particularly the case for solutions that must combat the increasing threat of interference. Since operators do not have prior knowledge of where, when or at what frequency interference could be observed, a flexible payload solution is desired to minimize the impact of interference on operation.

There is a variety of approaches that provide in orbit flexibility and that can combat the impact of interference on satellite systems: for example, the payload can comprise adjustable hardware, such as steerable antenna, active antennas which can reconfigure their coverage or hardware enabling to modify the frequency response to combat the interfered signal.

However, the known solutions require significant amount of extra hardware to enable systems to be switched in the event of interference. Given that space is limited on satellites, this can often restrict the overall mission.

Another approach to combat interference is to design an area within which interference could be anticipated and therefore rejected. This region could be potentially very large since we have no prior knowledge of the event. This can significantly over-constrain the design and potentially impact performance. This prudent approach of designing to an enveloping scenario is often taken when in actuality the interference will occur from a small zone within this region.

Besides, interference solutions provided in the prior art focus on rejecting the interference signal such that the effected channels are typically suppressed.

SUMMARY

An aspect of the current invention aims at providing a flexible payload that can be reconfigured in the event of interference with minimal impact on the uplink and downlink signals.

Another aspect of the invention is to provide a flexible payload that can be reconfigured without requiring additional hardware through in-built flexibility.

Another aspect is to provide a simple and efficient arrangement that allows in-orbit flexibility, capable of providing a frequency plan that is dynamic in the event of interference combined with flexible coverage reconfigurability.

In an embodiment, the solution provided here uses channel notching to filter the spectrum that has been interfered, and combines this with a spatially isolated beam that is formed by a reconfigurable antenna in order to avoid the coverage area that has been interfered. This allows for the main mission to be operated with minimal impact while configuring a beam that isolates the location where the interference is coming from. Agile filters are used to provide flexibility at the payload and provide spectral isolation. In combination with this, a reconfigurable antenna is used to provide a reconfigurable beam. The reconfigurable antenna is used to recover the signal at the interfered frequency whilst avoiding the interference location. The solution therefore provides both spectral and spatial isolation.

More precisely, a first embodiment of the invention concerns a flexible payload for satellite comprising:

A main uplink antenna device configured to receive at least a main uplink signal over a main coverage area;

A reconfigurable uplink antenna device configured to receive a complementary uplink signal over a complementary coverage area;

A command device configured to define the complementary coverage area of the reconfigurable uplink antenna device;

An agile converting device configured to generate a spectral hole in the bandwidth of the main uplink signal.

An embodiment of the invention combines then spatial isolation with spectral isolation in order to minimize the impact of interference on the satellite mission. As a matter of fact, the flexible payload comprises agile filter device that provides channel notching to filter the spectrum that has been interfered and reconfigurable uplink antenna device to recover the signal at the interfered frequency while avoiding the coverage area that is interfered. In using the reconfigurable uplink antenna device not only do we use the payload to operate at the necessary channel centre frequency but it is employed in conjunction with a flexible coverage area, reconfigured in orbit in direct response to the interference location. This allows the coverage to be modified such that over the small bandwidth, the operator is able to uplink signals where required while isolating the jamming location. At the same time, the original coverage is maintained across the wide bandwidth, with the exception of the frequency band that has been interfered. This configuration therefore provides spectral isolation by transferring the interfered channel to the reconfigurable uplink antenna device, and spatial isolation by reconfiguring the beam. It must be noted that the flexible payload design is an attractive solution without the occurrence of an interference scenario. The additional clear benefit of interference mitigation is therefore an attractive prospect for satellite operators.

The flexible payload according to an embodiment of the invention can also comprise one or several of the following features, taken individually or according to all possible technical combinations.

According to one embodiment, the agile converting device comprises:
  a divider configured to separate the main uplink signal in at least two bands;
  a downconverter configured to convert the frequency of all signals received by the uplink antenna device to a common intermediate frequency;
  Reconfigurable filter configured to adjust the centre frequency and bandwidth of each band.

The common intermediate frequency may also be called baseband.

According to one embodiment, the flexible payload further comprises:
  at least one downlink antenna device, and, in an embodiment, at least two downlink antenna devices;
  a downlink switch matrix configured to connect any pair of satellite uplink and downlink antenna devices.

Beneficially, the flexible payload further comprises an upconverter configured to convert the signals at the common intermediate frequency to signals at a frequency to be transmitted by the downlink antenna device.

According to different embodiments, the downlink switch matrix may operate either at an intermediate frequency or at the common intermediate frequency.

According to an embodiment, the flexible payload comprises flexible amplifier configured to flexibly allocate power to the different downlink antenna device.

According to an embodiment, the reconfigurable uplink antenna device comprise a reconfigurable phased array antenna.

A further embodiment could be a fixed spot beam approach in which spot beams are switched in and out depending on the interference location.

A second embodiment of the invention concerns a method of reconfiguring a flexible payload for satellite according to any of the previous claims in case of interference, the interference having an interference frequency over an interfered coverage area, the method comprising:
  Receiving a main uplink signal over a main coverage area, the main uplink signal having a bandwidth of frequency;
  Forming a notch signal by generating a spectral hole in the bandwidth of the main uplink signal, the spectral hole being generated to include the interference frequency;
  Defining the complementary coverage area so that it corresponds to the main coverage area without the interfered coverage area;
  Receiving a complementary uplink signal with the reconfigurable uplink antenna device;
  Forming a downlink signal based on the notch signal and on the complementary uplink signal.

Thus the method proposes then to combine:
  a spectral filtration of the main uplink signal in order to keep, over the main coverage area, the wide bandwidth of the main uplink signal, with the exception of an interfered frequency band comprising the interfered frequency; and
  a spatial filtration in order to have a complementary uplink signal comprising the interfered frequency band, over the main coverage area with the exception of the interfered coverage area.

The method according to an embodiment of the invention can also comprise one or several of the following features, taken individually or according to all possible technical combinations.

According to an embodiment, the step of forming the notch signal comprises:
  Separating the bandwidth of the main uplink signal into at least two full bands;
  Dividing each full band into a first and a second sub-bands;
  Adjusting the centre frequency and bandwidth of each sub-band in order to have the interference frequency excluded of each sub-band.

In other words, the first sub-band is filtered so that the first sub-band presents a stop edge below and adjacent to the interference frequency, while the second sub-band is filtered so that the second sub-band presents a start edge above and adjacent to the interference frequency.

Each full band presents a bandwidth of 250 MHz as an example.

The bandwidth of the spectral hole depends on the embodiments and on the interference. At the spectral isolation level only, it is beneficial to keep the hole as small as possible and limited to the size of the interference bandwidth in order to restrict the impact on the retained operation.

According to an embodiment, the step of combining the notch signal and the complementary uplink signal comprises a step of converting the frequency of the notch signal and of the complementary uplink signal to a common intermediate frequency.

According to an embodiment, the complementary uplink signal is filtered in order to present a bandwidth corresponding to the spectral hole generated in the bandwidth of the main uplink signal which is now broadened to include the full wanted uplink signal at the interference frequency as opposed to limited to reject the interference. This is then used together with the uplink antenna that provides the spatial isolation.

DETAILED DESCRIPTION

Figure 1:
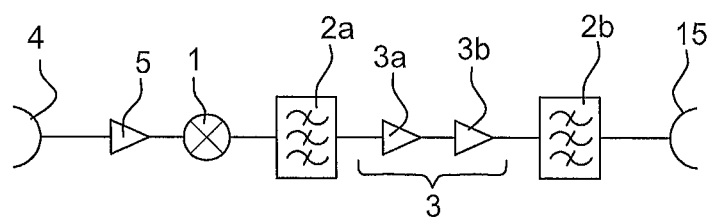
FIG. 1 represents a block diagram of a transponder of the prior art.

FIG. 1 represents a transponder of the prior art. Such a transponder classically comprise an uplink antenna 4, a low noise amplifier (LNA) 5, a converter 1, an input is filter or demultiplexer 2a, an amplification chain 3, including a channel amplifier 3a and a high power amplifier (HPA) 3b, an output filter or multiplexer 2b and a downlink antenna 15.

Figure 2:
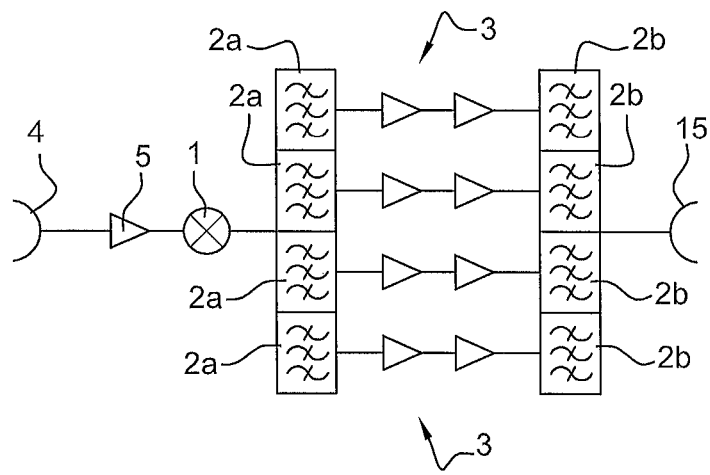
FIG. 2 represents a block diagram of a flexible payload of the prior art.

FIG. 2 represents a typical satellite payload of the prior art. Such a satellite payload generally comprises transponders that form communication channels between the uplink 4 and downlink antennas 15. The uplink and downlink antennas 4, 5 form the coverage patterns for a defined service area which combine for all communication channels to form the satellite communication mission. Therefore each communication mission typically has a multiple of transponders transmitting and receiving a number of communication channels.

Figure 5:
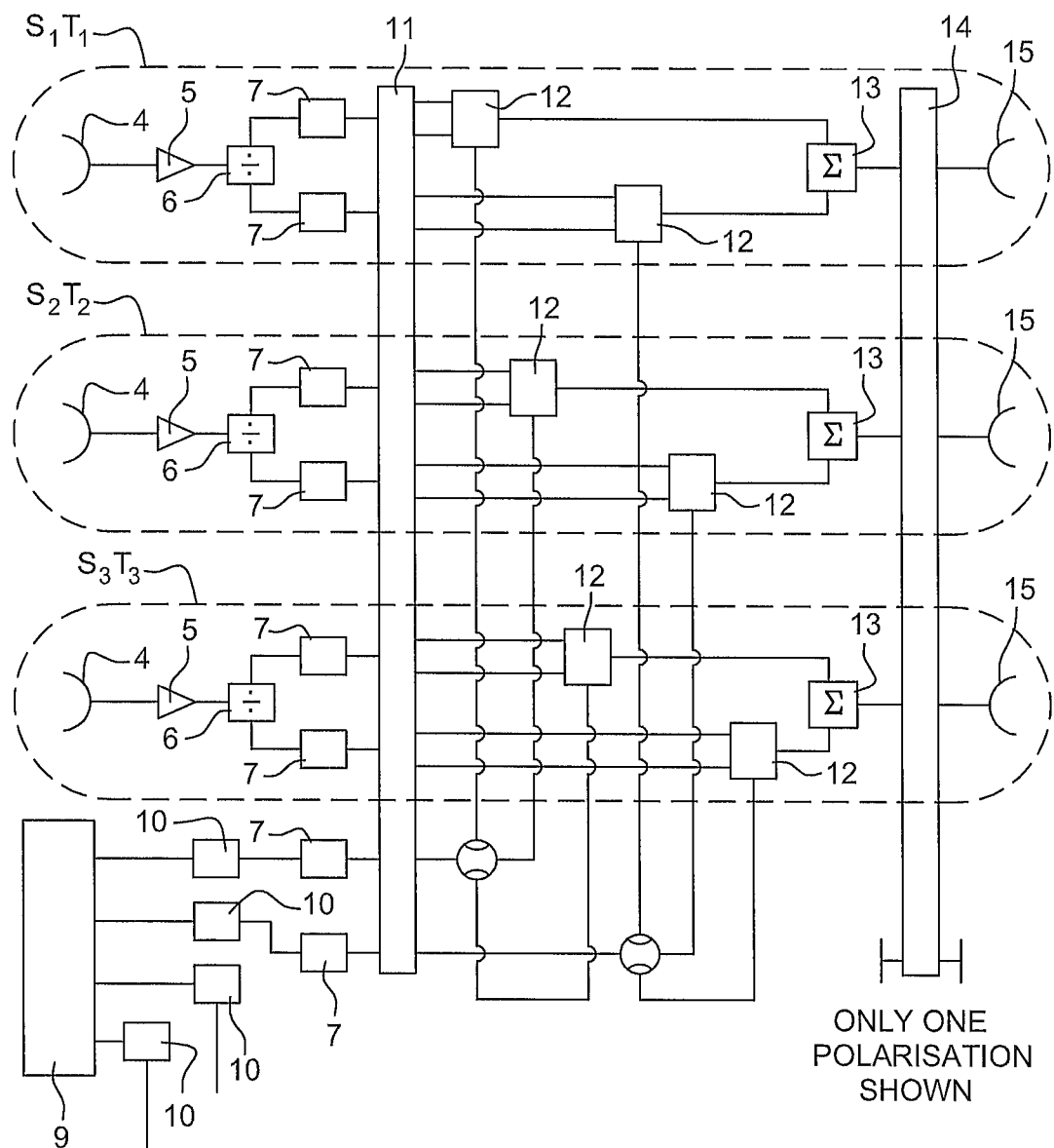
FIG. 5 represents a block diagram of a flexible payload according to an embodiment of the invention.

A flexible payload according to an embodiment of the invention is represented in FIG. 5. FIG. 5 shows a payload that uses one polarisation for the uplink and one polarisation for the downlink, but the payload typically exploits both polarizations on uplink and downlink.

The flexible payload comprises at least one transponder per communication mission S1, S2, S3.

Each communication mission S1, S2, S3 comprises main uplink antenna device 4 adapted to receive a main uplink signal emitted over a main coverage area.

Within each communication mission S1 S2 S3, each transponder S1T1, S1T2, S1T3 share a common uplink antenna.

Each transponder S1T1, S1T2, S1T3 further comprises a low noise amplifier 5.

Each transponder S1T1, S1T2, S1T3 further comprises an agile converting device or converter configured to operate over the bandwidth of the operating transponders.

To that purpose, the agile converting device comprises a frequency divider 6 configured to separate the bandwidth of the main uplink signal into at least two full bands of 250 MHz and then to divide each full band into a first and a second sub-bands SA11 ... SB33 as represented on FIG. 3.

Each agile converting device further comprises a downconverter 7 configured to convert the frequency of each sub-band to a common intermediate frequency.

The flexible payload further comprises reconfigurable uplink antenna device 9 configured to receive an uplink signal from a complementary coverage area. These reconfigurable uplink antenna device 9 comprises a phased array antenna. In an embodiment, the phased array antenna is capable of providing at least two independently configured beams. In this example four beams 10 are assumed. Each beam 10 enables to receive a complementary uplink signal over a correspondent complementary coverage area. The independently configured beams enable to define the complementary coverage areas of the reconfigurable uplink antenna device 9. The flexible payload further comprises a command device adapted to define the complementary coverage area of the reconfigurable uplink antenna device. Consequently, thanks to the command device, it is possible from earth to configure each beam of the reconfigurable uplink antenna device.

The flexible payload further comprises a switch matrix 11 configured to connect any pair of satellite uplink and downlink antenna device. The switch matrix 11 allows connectivity between any pair of satellite uplink and downlink beams. It is essentially a splitter between the uplink signals in to the required downlink sections.

The flexible payload further comprises a reconfigurable filter 12 configured to adjust the centre frequency and bandwidth of each sub-band in response to the frequency and bandwidth of the interfering signal.

The flexible payload further comprises combining device or combiner 13 configured to combine any incoming signals.

The flexible payload further comprises flexible amplifier 14 configured to flexibly allocate power to the different downlink antenna device according to the specific needs across the different missions. To that purpose, the flexible amplifier could comprise a Multi-port Power Amplifier.

The reconfigurable filter 12, flexible amplifier 14 form upconverter configured to convert the common intermediate frequency to the frequency of signals to be transmitted by the downlink antenna device.

Each transponder S1T1, S2T2, S3T3 further comprises a downlink antenna device 15 configured to transmit downlink signals. As with the uplink signals, multiple transponders share the downlink antennas 15 and transmit multiple downlink channels to the coverage served by the downlink antennas.

A method according to an embodiment will now be described with reference to FIGS. 3, 4a, 4b, 4c, in the case of an interference having an interference frequency fi over an interfered coverage area Ci. In the following example, only one polarization is considered but the same method is applicable with two polarizations.

Figure 4A:
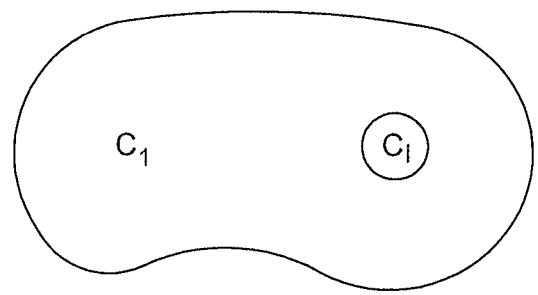
FIG. 4a, 4b, 4c represents coverage areas of a flexible payload according to an embodiment of the invention.
Figure 4B:
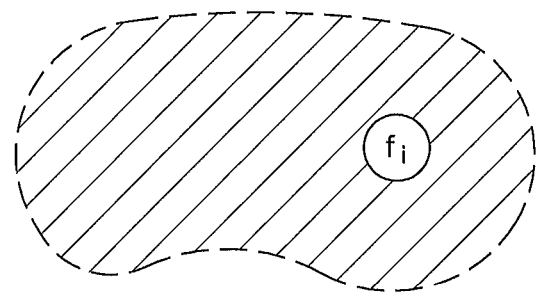
Figure 4C:
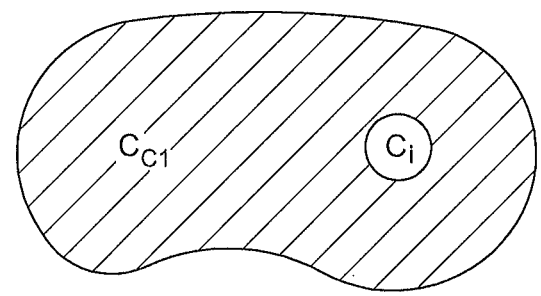

A main uplink antenna 4 receives a main uplink signal, respectively S1, emitted over a coverage area, respectively C1, as represented on FIG. 4a.

Figure 3:
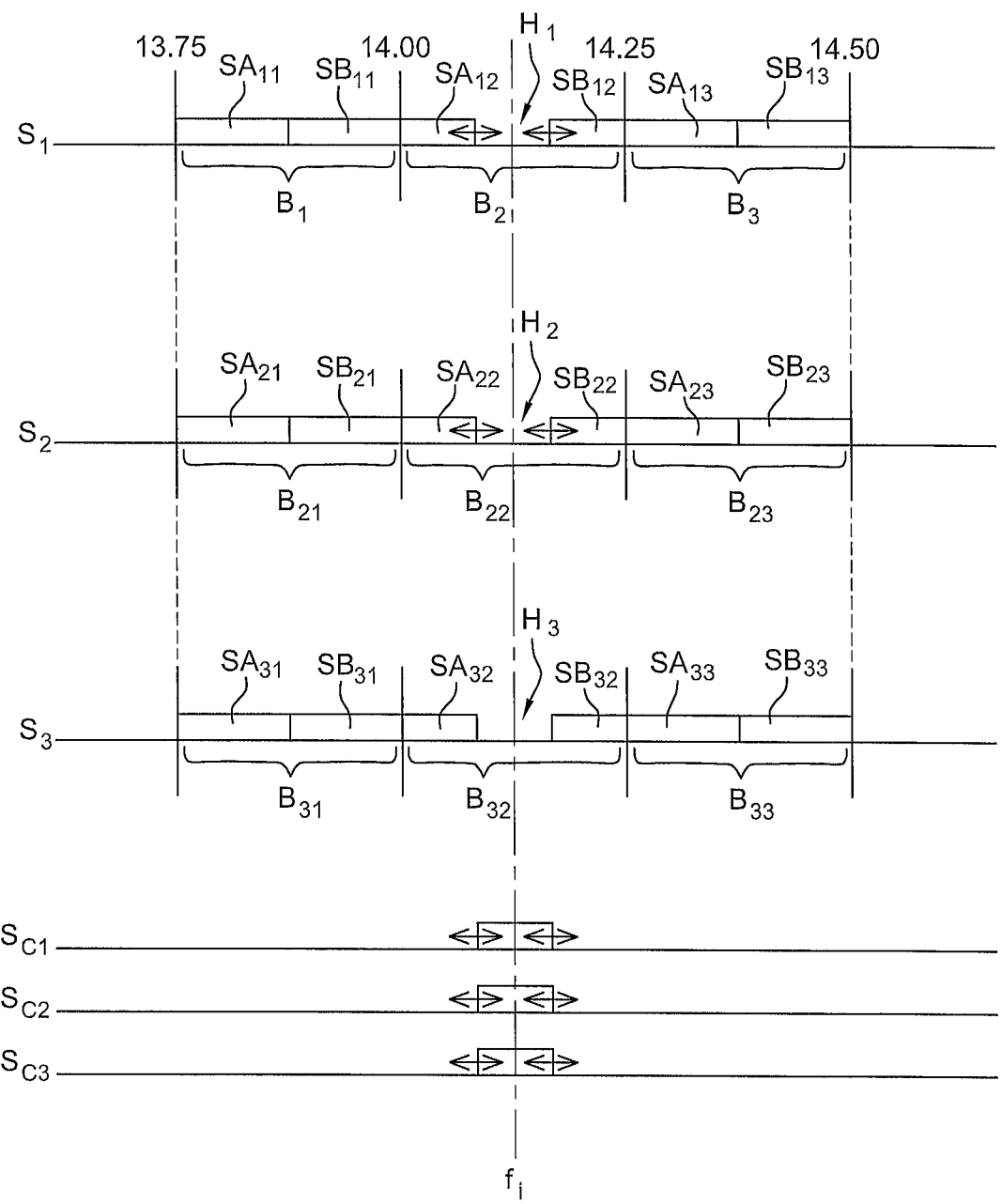
FIG. 3 represents a simplified uplink frequency plan with variable channel center of a flexible payload according to an embodiment of the invention.

FIG. 3 illustrates a simplified frequency plan for each received uplink signals by the flexible payload of FIG. 5.

As represented, the method comprises first a step of receiving main uplink signals S1, S2, S3 corresponding to each mission that the flexible payload has to fulfill.

Each main uplink signal S1, S2, S3 is then amplified.

The method comprises then a step of forming a notch signal by generating a spectral hole in each main uplink signal that has been interfered.

To that purpose, the uplink signal S1 is first separated into bands $B_{11}$, $B_{12}$, According to an embodiment, each band presents a bandwidth of 250 MHz.

Each band of each uplink signal may then be separated into two sub-bands $SA_{11}$, $SB_{11}$, $SA_{12}$, $SB_{12}$.

The method comprises then a step of converting the frequencies of every sub-bands into a common intermediate frequency.

Using the channelizing section, the centre frequency and bandwidth of each sub-band comprising the interfered frequency fi is then adjusted so that the interfered frequency fi is excluded. A spectral hole H1, including the interfered frequency fi is then formed.

Consequently, the method comprises a step of spectral filtration and channelization enabling to form at least one notch signal in which a spectral hole has been formed around the interfered frequency.

The method thus enables continuing reception of uplink signals S1 from the coverage C1 with the exception of the interfering signal frequency fi.

The example detailed is provided for an interferer from a location Ci at an interfering frequency fi that interferes with one signal S1. The solution detailed above can be applied to a number signals.

The method further comprises a step of receiving a complementary uplink signal $S_{C1}$, $S_{C2}$, $S_{C3}$ for each main signal S1, S2, S3 that has been interfered. In that embodiment, the method comprises then a step of receiving three complementary uplink signals $S_{C1}$, $S_{C2}$, $S_{C3}$. To that purpose, the reconfigurable uplink antenna device is configured so that they can receive complementary uplink signals over complementary coverage areas. Each complementary coverage area $C_{C1}$, $C_{C2}$, $C_{C3}$ corresponds to a main coverage area respectively C1, C2, C3 without the interfered coverage area Ci. Each complementary uplink signal $S_{C1}$, $S_{C2}$, $S_{C3}$ comprises at least a bandwidth corresponding to the bandwidth of the spectral hole H1, H2, H3. The hole is wide enough to include the interference signal and the interfered signals. Consequently, the method comprises a step of spatial filtration adapted to form at least a complementary uplink signal over a complementary coverage area corresponding to the main coverage area of the main uplink antenna device minus the interfered coverage area.

The method may then comprise a step of allocating power to the different downlink antenna device in function of the downlink signals that will be transmitted.

The method comprises then a step of transmitting the downlink signals.

While the present invention has been particularly described with reference to the preferred embodiments, it should be appreciated by those of ordinary skill in the art that changes and modifications in form and details may be made without departing from the scope of the invention. For example, even if only one polarization has been considered, each uplink signals may comprise two polarizations. In that case, the spectral hole may be of different size and location for the two polarizations. Besides, in the described embodiment, the flexible payload comprises three main uplink antennas devices and three downlink devices. However, the invention is not limited to that number of antennas devices. In particular, one example of interfering particular frequency band and over coverage can perform the same process for a number of signals.

Having described and illustrated the principles of the invention with reference to various embodiments, it will be recognized that the various embodiments can be modified in arrangement and detail without departing from such principles. It should be understood that the devices, filters, amplifiers, programs, processes, or methods described herein, and more generally any elements of the flexible payload for satellite described herein are not related or limited to any particular type of computing environment, unless indicated otherwise. Various types of specialized computing environments may be used with or perform operations in accordance with the teachings described herein. Elements of embodiments shown in software may be implemented in hardware and vice versa.

One or more devices, processors or processing devices may be configured to carry out the function(s) of each of the elements of the flexible payload for satellite described herein. For example, the one or more devices, processors or processing devices are configured to execute one or more sequences of one or more machine executable instructions contained in a main memory to implement the method(s) or function(s) described herein. Execution of the sequences of instructions contained in a main memory causes the processor to perform at least some of the process steps or function(s) of the elements described herein. One or more processors in a multi-processing arrangement may also be employed to execute the sequences of instructions contained in a main memory or computer-readable medium. In alternative embodiments, hard-wired circuitry may be used in place of or in combination with software instructions. Thus, embodiments are not limited to any specific combination of hardware circuitry and software.

The term "computer-readable medium" as used herein refers to any medium that participates in providing instructions to a processor for execution. Such a medium is non-transitory and may take many forms, including but not limited to, non-volatile media, volatile media, and transmission media. Non-volatile media include, for example, optical or magnetic disks. Volatile media include dynamic memory. Transmission media include coaxial cables, copper wire and fiber optics. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor for execution.

The computer program comprising machine executable instructions for implementing the method described herein or function(s) of various elements of the flexible payload for satellite can be implemented by a computer comprising at least an interface, a physical processor and a non-transitory memory (also broadly referred to as a non-transitory machine readable or storage medium). The computer is a special purpose computer as it is programmed to perform the specific steps of the method(s) described above. The non-transitory memory is encoded or programmed with specific code instructions for carrying out the above method(s) and its/their associated steps. The non-transitory memory is arranged in communication with the physical processor so that the physical processor, in use, reads and executes the specific code instructions embedded in the non-transitory memory. The interface of the special purpose computer is arranged in communication with the physical processor and receives input parameters that are processed by the physical processor.

For example, the different elements shown at FIG. 5 can include one or more processors (which can be shared in an embodiment) and one more storage media (which can be shared in an embodiment).

It will be appreciated by one skilled in the art that the arrangement of FIG. 5 and methods described herein represent a solution to the technological problem currently faced by satellite designers for providing a flexible payload that can be reconfigured in the event of interference with minimal impact on the uplink and downlink signals.

The invention claimed is:

1. A flexible payload of a satellite comprising:
   a main uplink antenna device configured to receive at least a main uplink signal over a main coverage area;
   a reconfigurable uplink antenna device configured to receive a complementary uplink signal over a complementary coverage area;
   a command device configured to define the complementary coverage area of the reconfigurable uplink antenna device so that the complementary coverage area corresponds to the main coverage area without an interfered coverage area; and
   an agile converting device configured to generate a spectral hole in the bandwidth of the main uplink signal.

2. The flexible payload according to claim 1, wherein the agile converting device comprises:
   a frequency divider configured to separate the main uplink signal in at least two sub-bands;
   a downconverter adapted to convert the frequency of all signals received by the uplink antenna device to a common intermediate frequency, and
   a reconfigurable filter configured to adjust a centre frequency and bandwidth of each sub-band.

3. The flexible payload according to claim 1, further comprising:
- at least two downlink antenna devices;
- a downlink switch matrix configured to connect any pair of satellite uplink and downlink antenna devices.

4. The flexible payload according to claim 3, further comprising a flexible amplifier configured to allocate power to the different downlink antenna devices.

5. The flexible payload according to claim 1, wherein the reconfigurable uplink antenna device comprises a reconfigurable phased array antenna.

6. A method of reconfiguring a flexible payload of a satellite in case of interference, the interference having an interference frequency over an interfered coverage area, the method comprising:
- receiving a main uplink signal over a main coverage area, the main uplink signal having a bandwidth of frequency;
- forming a notch signal by generating a spectral hole in the bandwidth of the main uplink signal, the spectral hole being generated to include the interference frequency;
- defining a complementary coverage area of a reconfigurable uplink antenna device so that the complementary coverage area corresponds to the main coverage area without the interfered coverage area;
- receiving a complementary uplink signal with the reconfigurable uplink antenna device over the complementary coverage area; and
- forming a downlink signal based on the notch signal and on the complementary uplink signal.

7. The method of reconfiguring a flexible payload according to claim 6, wherein forming the notch signal comprises:
- dividing the bandwidth of the main uplink signal into at least two sub-bands;
- adjusting a centre frequency and bandwidth of each sub-band in order to have the interference frequency excluded of each sub-band.

8. The method of reconfiguring a flexible payload according to claim 6, wherein the operation of forming the downlink signal comprises combining the notch signal and the complementary uplink signal and converting frequencies of the notch signal and of the complementary uplink signal to a common intermediate frequency.

9. The method of reconfiguring a flexible payload according to claim 6, wherein the complementary uplink signal is filtered in order to present a bandwidth corresponding to the spectral hole generated in the bandwidth of the main uplink signal of the main uplink signal.

* * * * *